Oct. 15, 1935.                 G. F. UHDE                 2,017,517
                               CONVERTER
                         Filed June 28, 1932              2 Sheets-Sheet 1
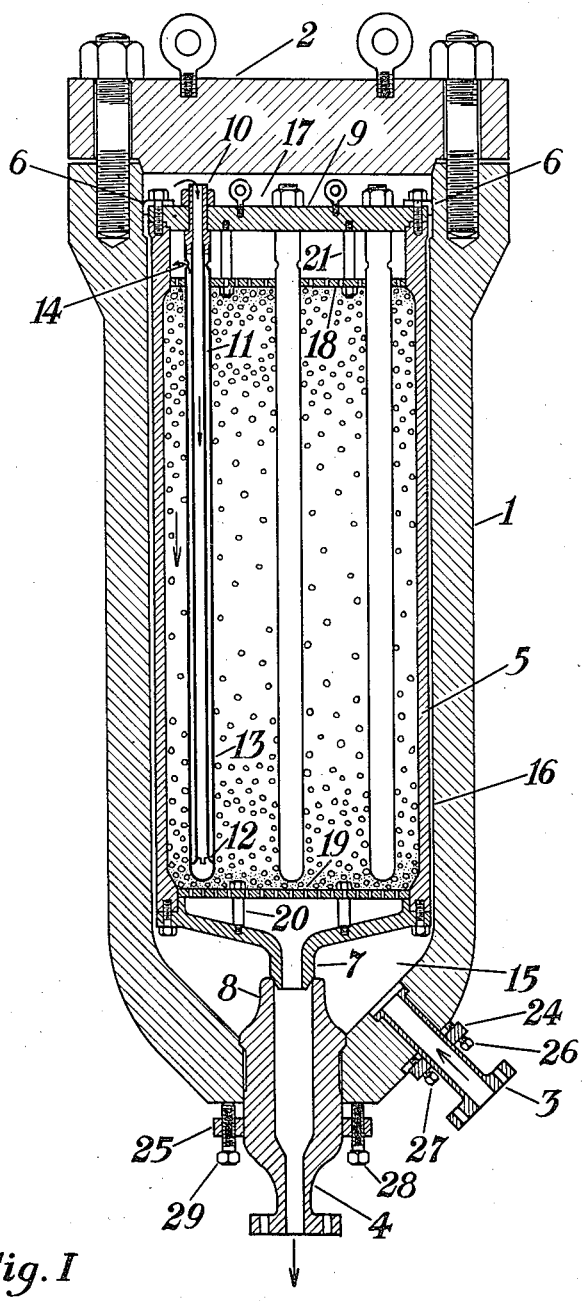
Fig. I
Inventor: Georg Friedrich Uhde
By his Attorney:

Oct. 15, 1935.  G. F. UHDE  2,017,517
CONVERTER
Filed June 28, 1932  2 Sheets-Sheet 2
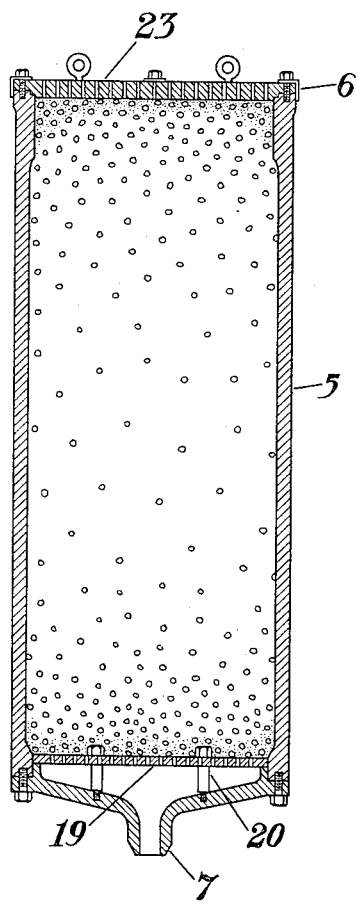
Fig. III
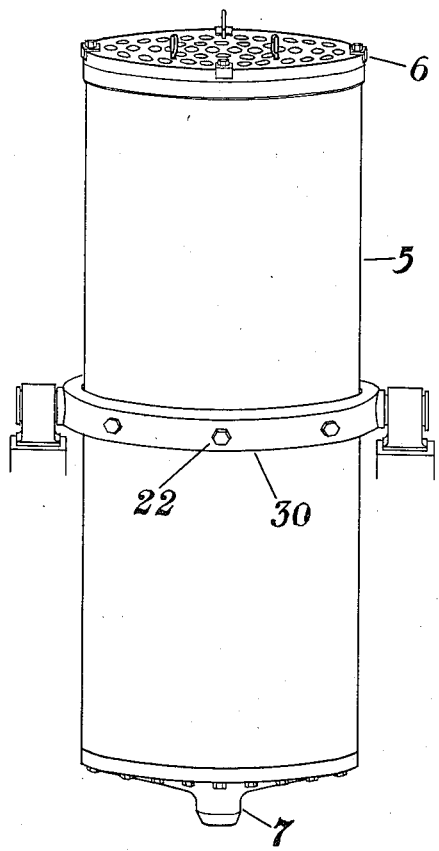
Fig. II
Inventor: Georg Friedrich Uhde
By his Attorney:

Patented Oct. 15, 1935

2,017,517

UNITED STATES PATENT OFFICE 2,017,517

CONVERTER

Georg Friedrich Uhde, Dortmund, Germany, assignor to Shell Development Company, San Francisco, Calif., a corporation of Delaware Application June 28, 1932, Serial No. 619,652

4 Claims. (Cl. 23—289)

This invention relates to converters containing catalytic material in an inner basket and is particularily concerned with the construction of the inner basket and method of placing the same in the converter shell.

My converter with its inner basket construction is of value in many high pressure gaseous exothermic reactions for instance, the synthesis of ammonia and of alcohol as well as in low pressure exothermic reactions involving the use of a catalyst such as the synthesis of sulphur trioxide.

In many catalytic processes it is periodically necessary to renew the catalyst as the catalyst deteriorates with use. This deterioration is considerably accelerated if owing to fortuitous circumstances the gases led into the converter are impure or the internal temperature becomes too high. It is of highest importance to be able to replace the catalyst with great facility. Many existing converters leave much to be desired in this respect.

In operating apparatus at high pressures and at elevated temperatures it is also most important to keep the pressure sustaining walls of the apparatus at a comparatively uniform temperature and to avoid sudden changes of temperature in the metal. If precautions are not taken to insure even heat distribution, fracture of the walls and leakage at the joints is very likely to take place.

It is an object of this invention to provide a converter in which the catalyst basket can be readily removed and replaced.

It is another object of this invention to provide a converter in which even heat distribution is effected.

A further object of this invention is to provide means by which the pressure within the converter tends to tighten the gas inlet and outlet connections. The further objects and advantages of my invention will be better and more fully understood from the following detailed description throughout which reference is made to the accompanying drawings.

Fig. I is a longitudinal sectional view of a converter constructed according to my invention.

Fig. II is a prospective view of catalyst basket in trunnion ring for filling.

Fig. III is a longitudinal sectional view of an alternate form of catalyst basket.

Referring to Fig. I, the converter shell comprises a pressure sustaining vessel (1) provided with a cover (2). An inlet (3) for the gas mixture is situated in the wall of the vessel in its bottom portion. An outlet (4) for the reacted gases is provided in the centre of the domed bottom of the converter shell.

The catalyst is contained in an inner basket (5) which is centrally located in the converter shell. This basket (5) is kept in a central position at its upper end by means of small distance pieces (6) attached to the top of the basket. The bottom of the catalyst basket is conical and is provided with a gas exit nozzle (7) which, when the basket is in position, fits into the inside of the interior extension (8) of the centrally located gas outlet piece (4) forming a gas tight seal. By this particular construction of the bottom section of the basket, the basket is kept in a central position.

The top of the basket is fitted with a plate (9) having nozzles (10) passing through it. These nozzles have attached to their lower projections open ended tubes (11) extending downward into the basket. The lower ends of these tubes have flared out serrated portions (12) whereby the tubes are kept centrally located in tubes (13) of greater diameter having closed lower ends. These outer tubes are attached to shoulders of the nozzles (10) and are provided with openings (14) in their walls in their uppermost portions.

While only one tube is shown in section it will be understood that all the tubes are of a similar construction and that while only three tubes are shown a large converter would be provided with a multiple of tube units.

The flow of gases in the converter is as follows:

Mixed gases, for instance nitrogen and hydrogen gases in the case of ammonia synthesis, enter the converter through inlet (3) and pass into space (15) surrounding the outlet extension (8). The gases next pass upward through the narrow annular space (16) between the inside of the pressure sustaining wall of the converter shell and the outside wall of the basket (5) into space (17), from which the gas mixture passes downward through nozzles (10) into the inner tubes (11). Emerging from the bottom of the inner tubes the gas flows upward through the annular space between tubes (11) and (13). The gas passes out through openings (14) down through a perforated plate (18) into the catalyst mass which surrounds the tubes. Thereafter the gas passes out through nozzle (7) into exit piece (4). The catalyst is held in place in the basket (5) by a suitable perforated plate (19) supported by stay bolts (20). The perforated plate (18) above the catalyst mass is also supported by stay bolts (21).

The above form of catalyst basket with the concentric tubes passing into the catalyst is most suitable for strongly exothermic catalytic reactions such as for instance the synthesis of ammonia. In such processes by the use of the concentric tubes the overheating of the catalyst can be prevented by the cooling effect of the incoming gas stream, as has been more particularly described in my co-pending application, Serial No. 138,749, filed September 30, 1926.

In catalytic processes which are not strongly exothermic I may dispense with the concentric tubes and use the form of basket shown in Fig. III in which parts common to both forms of basket are given like numerals.

My converter construction is especially adapted for the filling and replacing of catalyst, these operations being most difficult with converters having heat exchange tubes passing through the catalyst mass.

In order to facilitate these operations I make use of a trunnion ring (30) shown in Fig. II and empty and refill the basket from the bottom without disturbing the heat exchange tubes.

In filling a catalyst basket of the type shown in Fig. I the basket is lowered into the trunnion ring (21) to about its middle point and the clamping members (22) tightened. The basket is then turned upsidedown and the bottom conical section, staybolts and perforated plate are removed. Catalyst is next carefully put in place, the bottom assembly replaced and the basket turned right side up. The basket, now charged with catalyst, is lifted out of the trunnion ring, lowered into position in the converter shell, and the cover (2) bolted in place.

As is well known to those skilled in the art, the activity of most catalysts is in time so reduced that it becomes necessary to replace the used catalyst with fresh. By means of my readily removable basket this change is readily effected in my converter.

To replace the catalyst, the basket is removed, clamped in the trunnion ring, which is then revolved so that the catalyst basket is upside down and the bottom assembly taken off. The basket is then turned right side up so that the catalyst falls out. After again turning the basket upside down it is filled as described above.

When replacing catalyst in a basket of the type shown in Fig. III it is only necessary to take off the top perforated plate (23), empty out the used catalyst, and refill with fresh.

The above method of filling converters is far simpler and more efficient than prior methods, as no pipe connections have to be broken.

Besides the ease with which the construction enables the converter to be charged with catalyst there are numerous other advantages of my design.

In high temperature catalytic reactions conducted at considerable pressure, it is of the utmost importance that the converters be so designed that temperature differences in adjacent parts of the apparatus be slight in order to prevent the possibility of fracture of the pressure sustaining wall. It is also important to design the apparatus so that an alteration in the shape of the converter due to temperature changes will not result in leaks at the various joints.

Both of the above requirements have been provided for in my converter construction.

In my apparatus the conduit for the gas stream coming from the catalyst (which is generally the hottest part of the apparatus) is in the center of the domed bottom section. Gases of different temperature will be in concentric rings at right angles to the longitudinal section of the converter so that the strain in the metal will be in the most favorable direction.

The basket being only attached to the converter shell at its bottom, can readily expand and contract independent of the converter shell.

Another feature of my construction is that the inlet and outlet pieces (3) and (4) are so fitted into the shell that the internal pressure serves to tighten the joints, so that heavy screw threading or bolting is not required at these points. The flanges (24) and (25) and bolts (26) (27) (28) and (29) being provided only to keep the inlet and outlet pieces positioned on their respective seats.

A still further feature of my construction is that by providing a large annular space (15) for the fresh gas in the bottom of the converter and a narrow space between the sides of the basket and the inside wall of the converter shell, the space (15), serves as a manifold to distribute the incoming fresh gas uniformly around the catalyst basket, thus preventing local cooling or overheating of the converter shell.

It should be readily understood that although I have shown a particular converter shell construction I do not intend to limit myself thereto. I may for instance make use of a cylindrical barrel having top and bottom covers and in which the bottom cover carries the centrally located gas outlet piece and the gas inlet piece. I may also make use of a lined converter shell in which an outside pressure sustaining wall, pierced by holes, backs up a thin inner gas tight wall.

I claim as my invention:

1. A converter comprising a pressure sustaining vessel, a catalyst basket solely supported in said vessel by the gas outlet piece from the vessel said gas outlet piece having its interior end of greater diameter than the remainder of said gas outlet piece whereby an internal pressure in said vessel tightens said piece in the wall of the vessel, and projections from the top of said basket whereby the basket is held in spaced relationship from the wall of the vessel.

2. A converter comprising a pressure sustaining vessel, a removable catalyst basket in said vessel, a gas outlet piece attached to said basket, a gas outlet piece in the bottom wall of said vessel, the former gas outlet piece seating on the latter gas outlet piece, the latter gas outlet piece having its interior end of greater diameter than its remainder whereby an internal pressure in said vessel tightens said piece in the wall of the vessel.

3. A converter comprising a pressure sustaining vessel, gas conduit pieces in the wall of said vessel, said gas pieces having their interior ends of greater diameter than the remainder of said pieces whereby an internal pressure in said vessel tightens said pieces in the wall of the vessel.

4. In a basket for a catalytic converter; the elements comprising a top cover, concentric heat exchange tubes attached to said cover, a screen supported in the top of the basket, a removable head and outlet piece at the bottom of said basket and a screen in said removable head.

GEORG FRIEDRICH UHDE.